(12) United States Patent
Schleicher

(10) Patent No.: US 6,181,080 B1
(45) Date of Patent: Jan. 30, 2001

(54) CIRCUIT FOR ACTUATING AT LEASE ONE ELECTRODE-LESS DISCHARGE LAMP

(75) Inventor: Gotthard Schleicher, Trostberg (DE)

(73) Assignee: Patent-Treuhand-Gesellschaft fuer elektrische Gluehlampen mbH, Munich (DE)

( * ) Notice: Under 35 U.S.C. 154(b), the term of this patent shall be extended for 0 days.

(21) Appl. No.: 09/381,343

(22) PCT Filed: Jan. 27, 1999

(86) PCT No.: PCT/DE99/00196

§ 371 Date: Sep. 20, 1999

§ 102(e) Date: Sep. 20, 1999

(87) PCT Pub. No.: WO99/41954

PCT Pub. Date: Aug. 19, 1999

(30) Foreign Application Priority Data

Feb. 10, 1998 (DE) .............................. 198 05 314

(51) Int. Cl.⁷ .................................................. H05B 41/16
(52) U.S. Cl. .......................... 315/248; 315/224; 315/225; 315/DIG. 7
(58) Field of Search .................................... 315/248, 291, 315/224, 225, DIG. 2, DIG. 5, DIG. 7, 249, 307

(56) References Cited

U.S. PATENT DOCUMENTS

| 5,063,332 | 11/1991 | El-Hamamsy et al. | 315/248 |
| 5,237,242 | * 8/1993 | Takahashi et al. | 315/225 |
| 5,574,336 | 11/1996 | Konopka et al. | 315/225 |
| 5,783,908 | * 7/1998 | Toda et al. | 315/DIG. 7 |
| 5,925,983 | * 7/1999 | Toda et al. | 315/225 |

FOREIGN PATENT DOCUMENTS

| 197 13 935 | 10/1997 | (DE) | H05B/41/36 |
| 196 50 110 | 6/1998 | (DE) | H05B/41/20 |
| 0016542 | 10/1980 | (EP) | H01J/65/00 |
| 0198632 | 10/1986 | (EP) | H05B/41/392 |
| 2251993 | 7/1992 | (GB) | H02H/7/00 |
| 2305311 | 4/1997 | (GB) | H05B/41/29 |
| 9630983 | 10/1996 | (WO) | H02B/37/02 |
| 9710610 | 3/1997 | (WO) | H01J/65/04 |

* cited by examiner

Primary Examiner—Don Wong
Assistant Examiner—Thuy Vinh Tran
(74) Attorney, Agent, or Firm—Carlo S. Bessone

(57) ABSTRACT

The invention relates to a circuit arrangement for operating at least one electrodeless discharge lams (LP1) having at least one voltage input (j10, j11) for supplying voltage to the circuit arrangement and electrical terminals (j12, j13) for at least one electrodeless discharge lamp (LP1). The circuit arrangement has supervisory means which ascertain the presence or the absence of the at least one electrodeless discharge lamp (LP1) at the electrical terminals (j12, j13) and enable the provision of the ignition or operating voltage for the at least one electrodeless discharge lamp (LP1) only when the at least one electrodeless discharge lamp (LP1) is connected to the electrical terminals (j12, j13).

5 Claims, 11 Drawing Sheets

CIRCUIT FOR ACTUATING AT LEASE ONE ELECTRODE-LESS DISCHARGE LAMP

Figure 1:
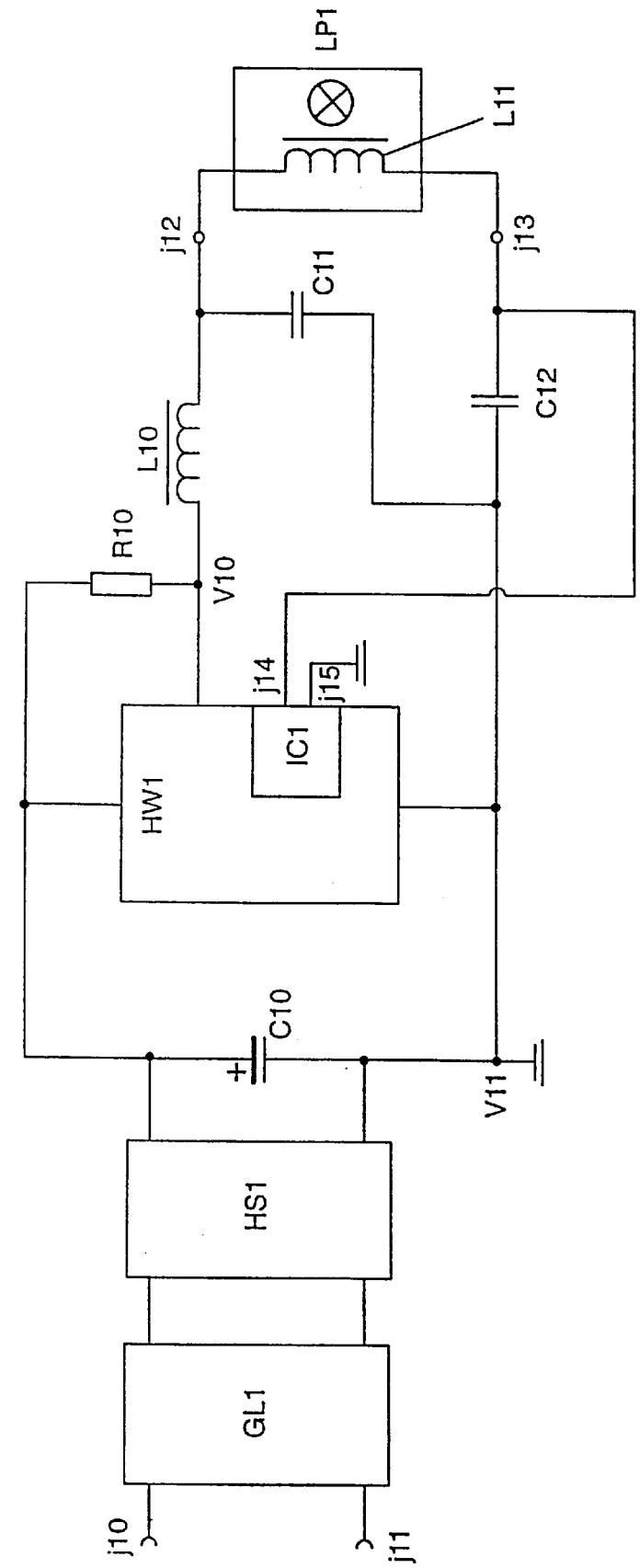

The invention relates to a circuit arrangement for operating at least one electrodeless discharge lamp.

I. Technical Field

The term electrodeless discharge lamp in this case denotes a gas discharge lamp which is excited by induction. This gas discharge lamp has a light-transmitting discharge vessel with an ionizable filling enclosed therein, which filling can be excited to effect the gas discharge. The gas discharge is excited by means of one or more induction coils with a closed ferrite core which are fixed on the exterior of the discharge vessel. The induction coils, to which a high-frequency AC voltage is applied, are arranged in such a way that they feed an electric field into the discharge vessel, which excites the ionizable filling in the interior of the discharge vessel to effect the gas discharge. This gas discharge has—in contrast to the gas discharge which takes place in the widely used fluorescent lamps having electrodes which project into the discharge vessel—an annularly closed discharge path. A more detailed description of an electrodeless discharge lamp is disclosed for example in the international published Patent Application WO 97/10610. The invention relates, in particular, to a circuit arrangement for operating an electrodeless discharge lamp of this type.

II. Prior Art

A prior art arrangement is described in U.S. Pat. No. 5,063,332, for example. This circuit arrangement has a half-bridge invertor with a resonant circuit connected downstream, to which the induction coil of an electrodeless discharge lamp is connected. One disadvantage of this circuit arrangement is that it still operates even in the absence of a lamp.

SUMMARY OF THE INVENTION

The object of the invention is to provide a circuit arrangement for operating at least one electrodeless discharge lamp which generates the ignition voltage required for igniting the gas discharge only when at least one lamp is connected to the electrical terminals of the circuit arrangement which are provided therefor.

The invention's circuit arrangement for operating at least one electrodeless discharge lamp has at least one voltage input for supplying voltage to the circuit arrangement and electrical terminals for at least one electrodeless discharge lamp and, according to the invention, is equipped with supervisory means which ascertain the presence or the absence of the at least one electrodeless discharge lamp and enable the provision of the ignition and/or operating voltage for the at least one electrodeless discharge lamp only when the at least one electrodeless discharge lamp is connected to the electrical terminals. These measures ensure that the ignition or operating voltage required for operation of the lamp is not generated in the absence of a lamp. Specifically, with no lamp connected, the extremely high ignition voltage would lead to the circuit arrangement being destroyed. If, on the other hand, the at least one electrodeless discharge lamp is connected to the electrical terminals, then the magnetic losses in the at least one induction coil of the electrodeless discharge lamp attenuate the ignition voltage prior to lamp ignition to such a great extent that a destructive effect on the components of the circuit arrangement is avoided. Unless at least one induction coil of at least one electrodeless discharge lamp is connected, no ignition attempts are made.

It is advantageous for the circuit arrangement according to the invention to have at least one voltage converter and one control circuit for the at least one voltage converter and also a load circuit connected downstream of the at least one voltage converter where the supervisory means interact with the control circuit in such a way that the control circuit generates driving pulses for the at least one voltage converter only when the at least one electrodeless discharge lamp is connected to the electrical terminals. As a result, the voltage converter can begin operating only when the at least one electrodeless discharge lamp is connected to the electrical terminals provided therefor. The voltage converter is advantageously designed as an inverter with a resonant circuit connected downstream, with the result that the ignition voltage required for igniting the gas discharge in the at least one electrodeless discharge lamp can be generated in a simple manner by the method of resonant increase. The control circuit of the voltage divider is advantageously designed as an integrated circuit.

The supervisory means of the circuit arrangement according to the invention advantageously have a current path and a current or voltage detector, where the current path has a first electrical resistance if the at least one discharge lamp is connected to the circuit arrangement, and a different electrical resistance if no discharge lamp is connected to the circuit arrangement, and where the current or voltage detector monitors the current flow or the voltage drop in the current path. The current path is advantageously designed in such a way that it is interrupted in the absence of the at least one electrodeless discharge lamp. Furthermore, the electrical terminals for the at least one electrodeless discharge lamp are advantageously arranged in the current path. In order to be able to ascertain the presence or the absence of the at least one electrodeless discharge lamp using simple means, it is advantageous for at least one induction coil of the at least one electrodeless discharge lamp to be arranged in the current path. The current path is advantageously a DC path.

A circuit arrangement for operating at least one electrodeless discharge lamp having at least one voltage input for supplying voltage to the circuit arrangement and electrical terminals for at least one electrodeless discharge lamp that has proved to be particularly advantageous is one which has at least one voltage converter and one control circuit, designed as an integrated circuit, for the at least one voltage converter and also a load circuit connected downstream of the at least one voltage converter, and which has, as the supervisory means which ascertain the presence or the absence of the at least one electrodeless discharge lamp at the electrical terminals and enable the provision of the ignition or operating voltage for the at least one electrodeless discharge lamp only when the at least one electrodeless discharge lamp is connected to the electrical terminals, a current path which is connected to a voltage supply terminal of the integrated circuit and is interrupted in the absence of the at least one electrodeless discharge lamp at the electrical terminals. In the absence of a lamp, the integrated circuit driving the at least one voltage converter consequently receives no supply voltage, with the result that the voltage converter cannot start operating—despite the mains voltage switched on at the voltage input of the circuit arrangement.

In accordance with another preferred exemplary embodiment, the supervisory means advantageously comprise a tap in the load circuit of the at least one voltage converter and a monitoring element, where the electrical potential at this tap has a first value if the at least one discharge lamp is connected to the circuit arrangement, and has a second, different value if no discharge lamp is connected to the circuit arrangement, and where the monitoring element monitors the electrical potential at the tap and generates an evaluation signal for the control circuit of the at least one voltage converter, said evaluation signal corresponding to the electrical potential. The monitoring element is advantageously designed as a logic circuit which is integrated into the control circuit or connected upstream of the control circuit.

Figure 2:
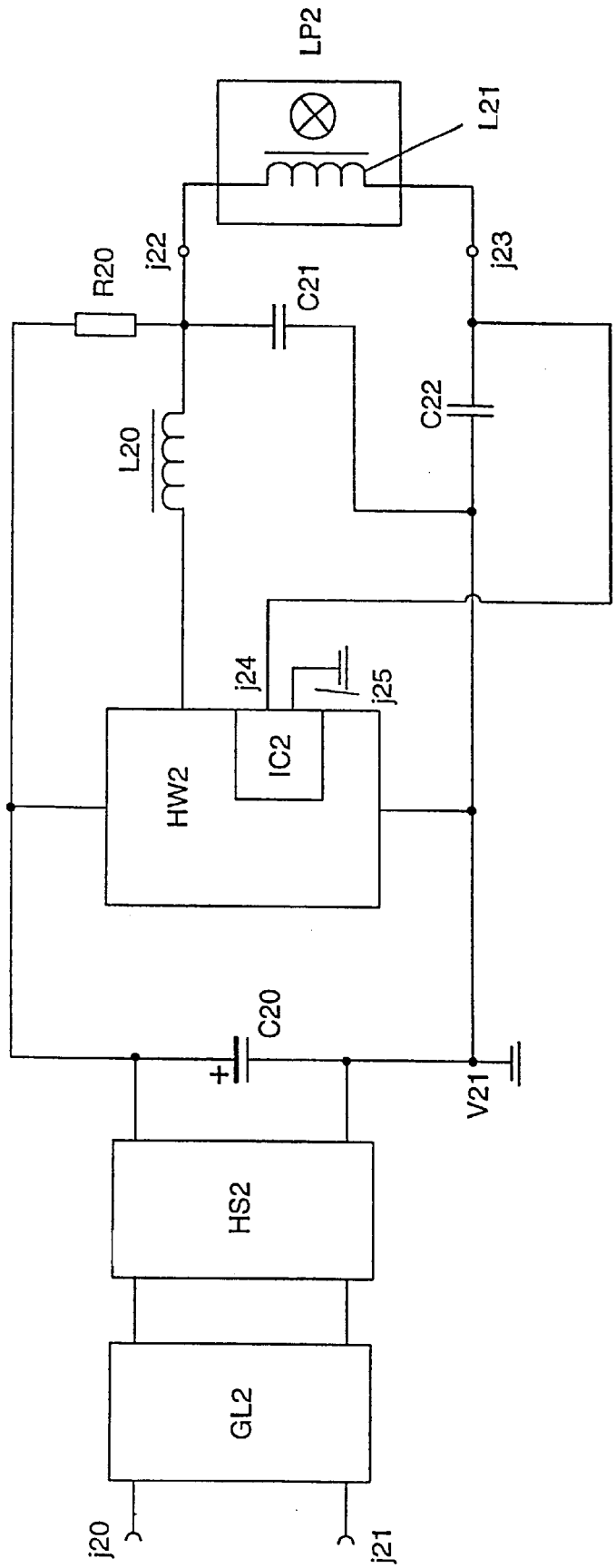
Figure 3:
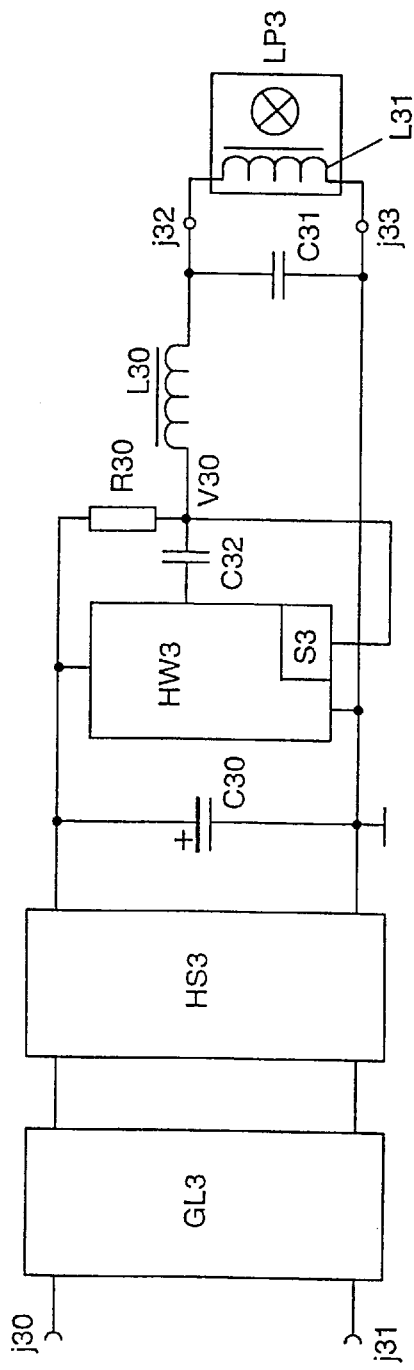
Figure 4:
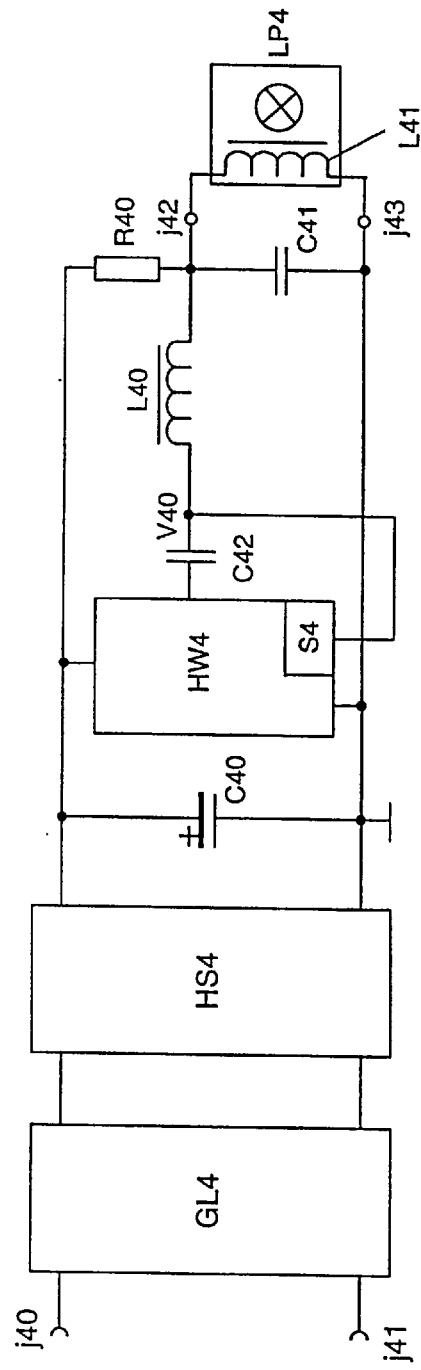
Figure 5:
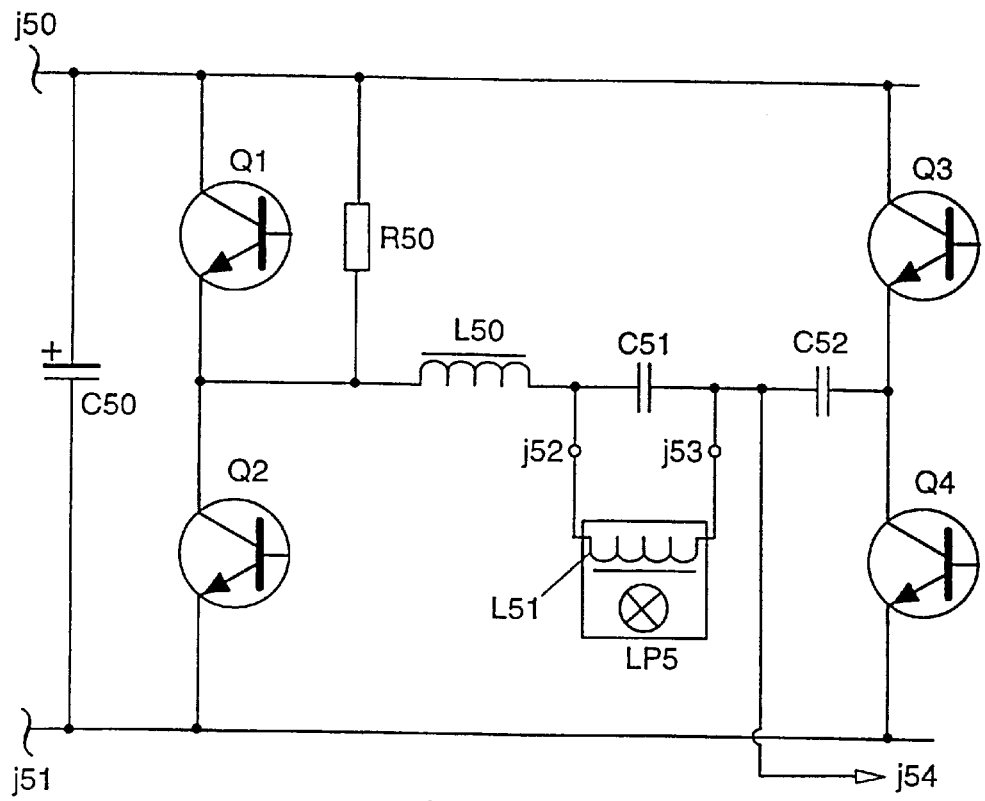
Figure 6:
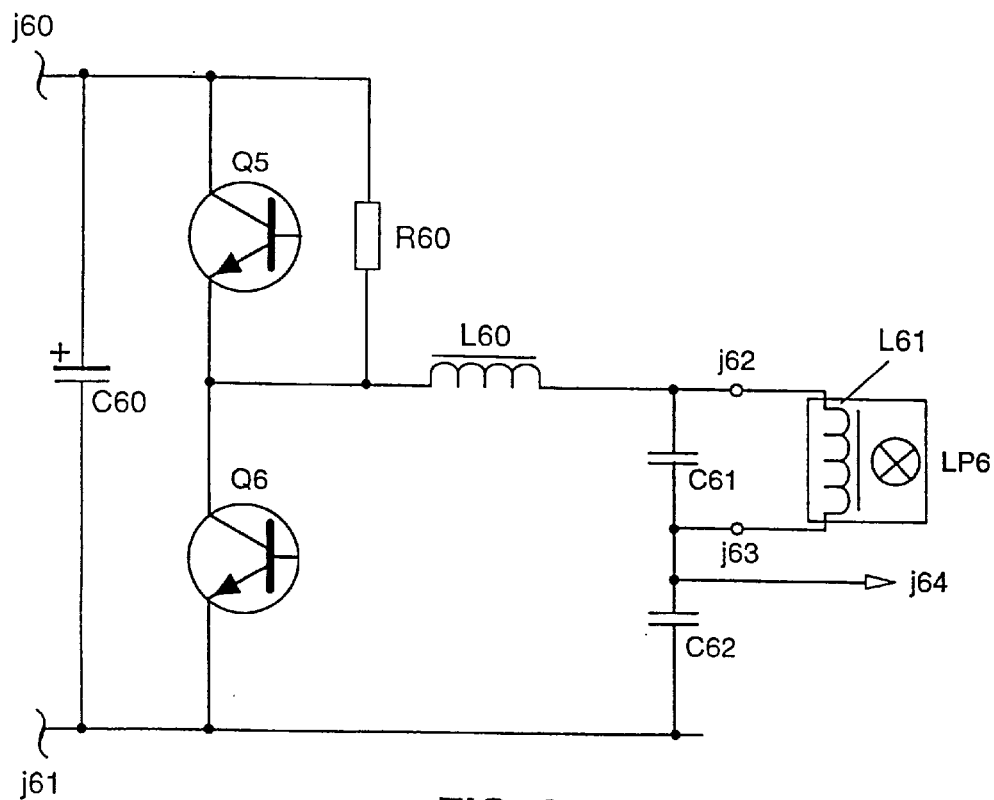
Figure 9:
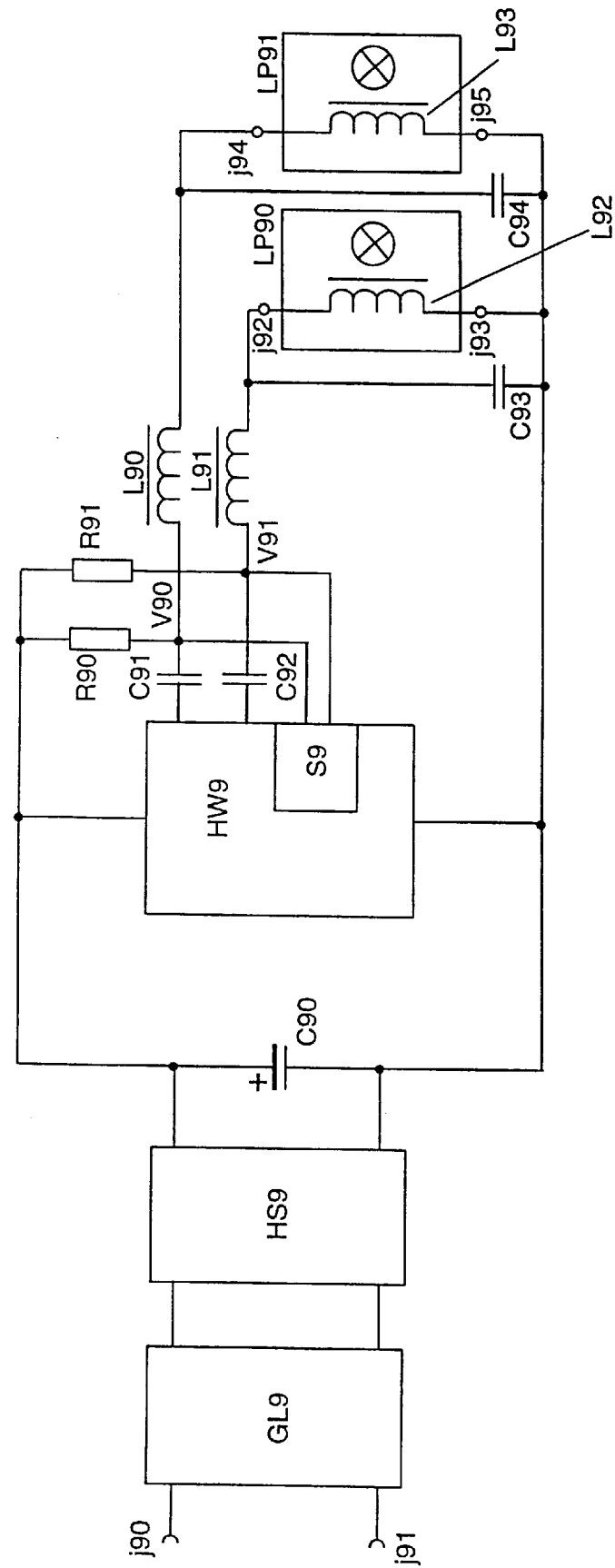
Figure 10:
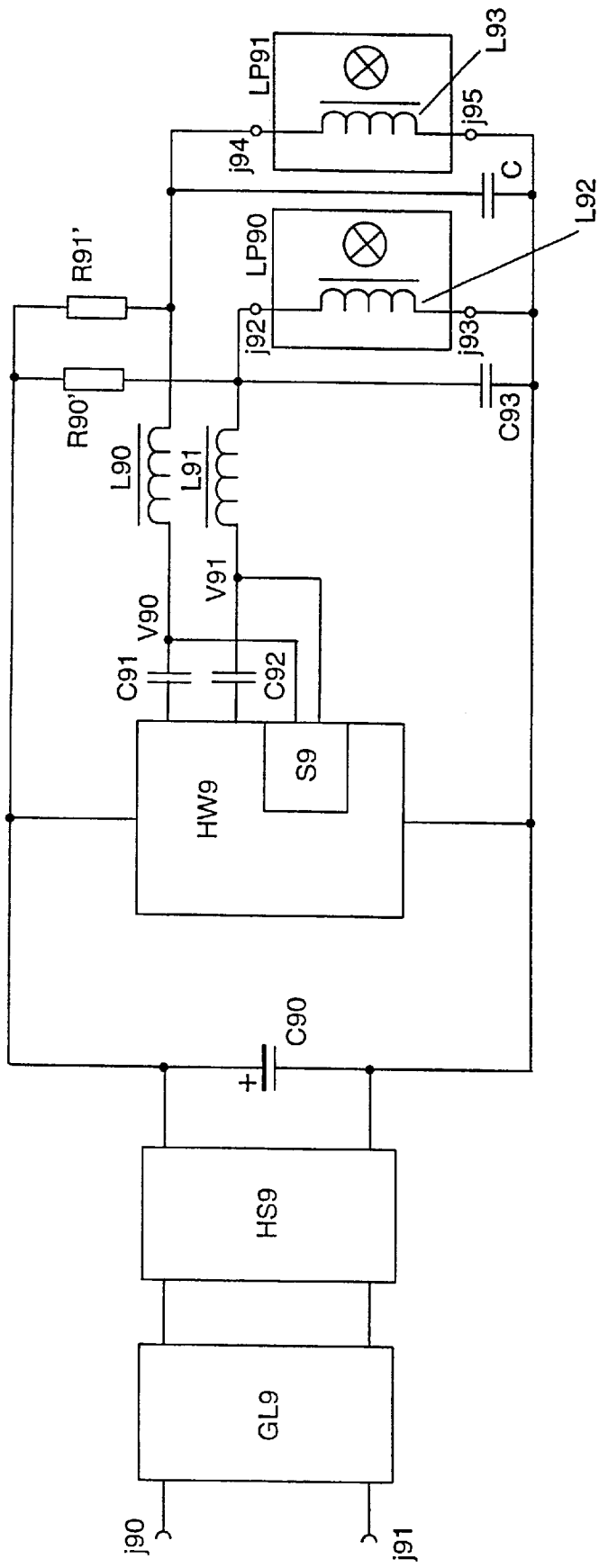
Figure 11:
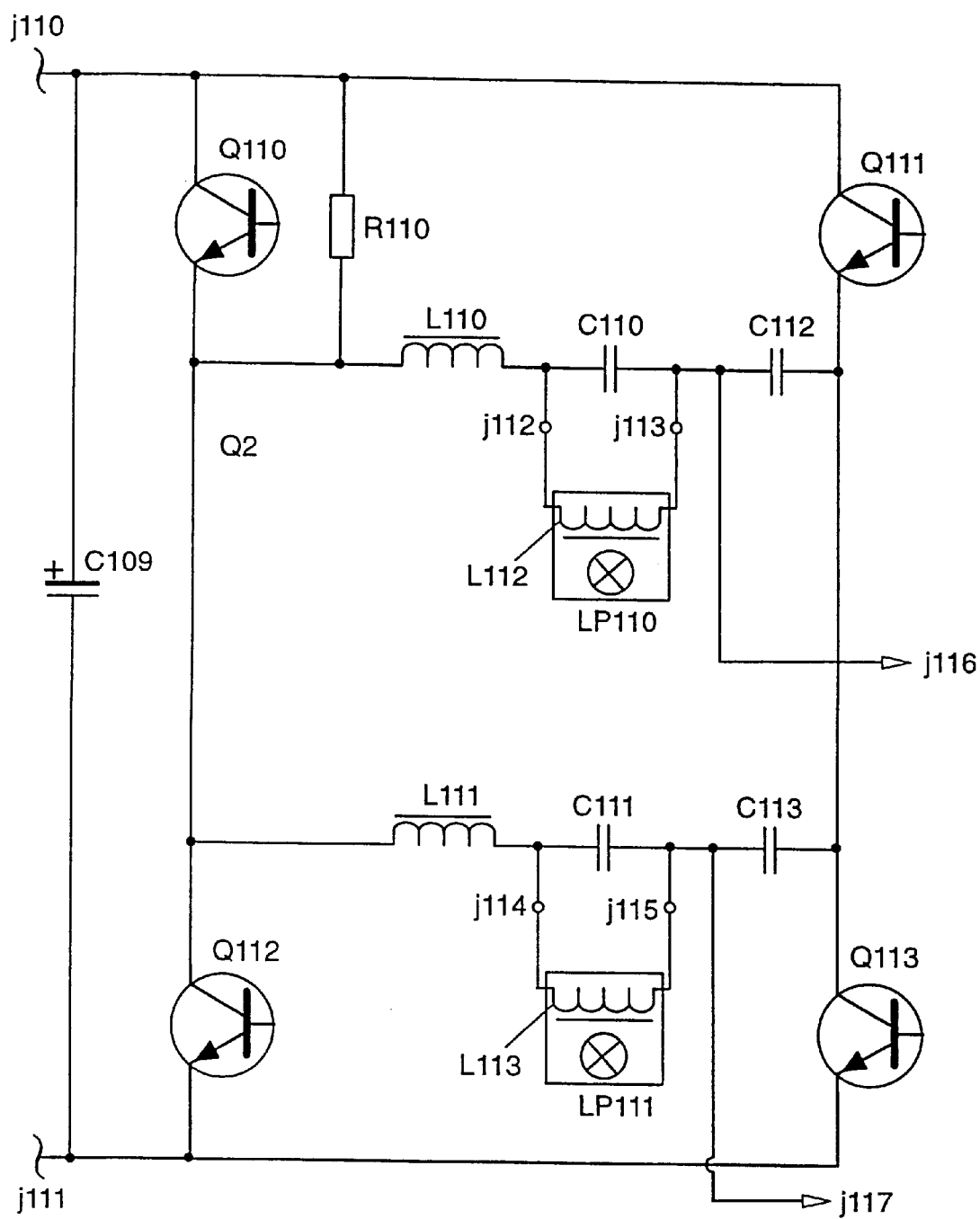
Figure 12:
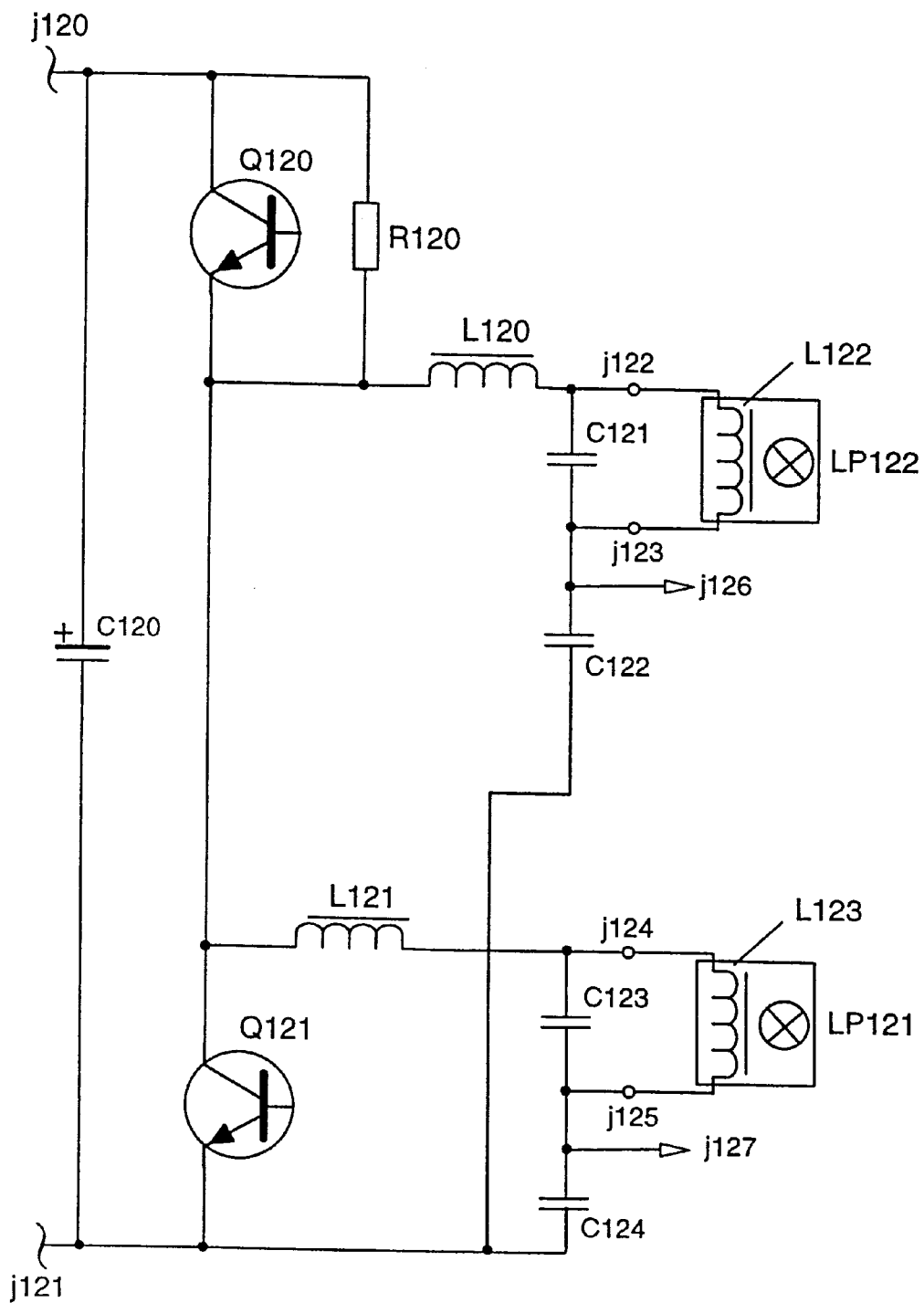
Figure 13:
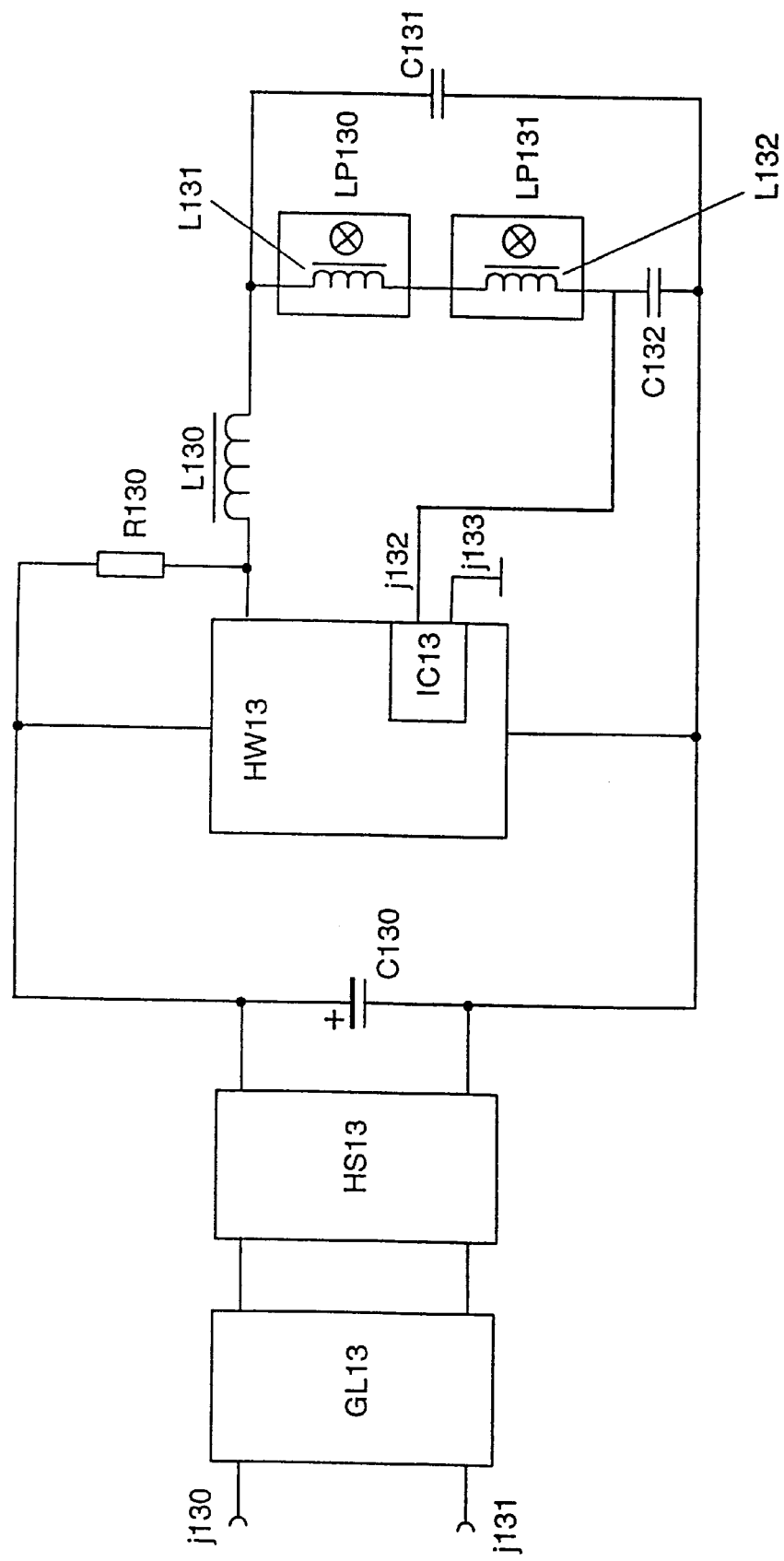

The invention is explained in more detail below using a plurality of preferred exemplary embodiments. In the figures:

FIG. 1 shows a sketched circuit diagram of the first exemplary embodiment of the invention in a schematic illustration FIG. 2 shows a sketched circuit diagram of the second exemplary embodiment of the invention in a schematic illustration FIG. 3 shows a sketched circuit diagram of the third exemplary embodiment of the invention in a schematic illustration FIG. 4 shows a sketched circuit diagram of the fourth exemplary embodiment of the invention in a schematic illustration FIG. 5 shows a sketched circuit diagram of the fifth exemplary embodiment of the invention in a schematic illustration FIG. 6 shows a sketched circuit diagram of the sixth exemplary embodiment of the invention in a schematic illustration FIGS. 7 to 10 show schematic sketched circuit diagrams according to exemplary embodiments seven to ten for two electrodeless discharge lamps which are connected in parallel and operated from an externally controlled half-bridge invertor FIG. 11 shows a schematic sketched circuit diagram according to the eleventh exemplary embodiment for two electrodeless discharge lamps which are connected in parallel and operated from a full-bridge invertor FIG. 12 shows a schematic sketched circuit diagram according to the twelfth exemplary embodiment for two electrodeless discharge lamps which are connected in parallel and operated from a free-running half-bridge invertor FIG. 13 shows a schematic sketched circuit diagram according to the thirteenth exemplary embodiment for two electrodeless discharge lamps which are connected in series and operated from a half-bridge invertor.

DESCRIPTION OF THE PREFERRED EXEMPLARY EMBODIMENTS

The circuit arrangement according to the first exemplary embodiment of the invention has a mains 5 voltage input with the mains voltage terminals j10, j11, which serve for supplying voltage to the circuit arrangement. A filter and a mains voltage rectifier GL1 connected downstream of the filter are connected to the mains voltage input. The filter reduces the high-frequency voltage components fed into the electricity mains by the circuit arrangement. A step-up converter HS1 is connected to the DC voltage output of the mains voltage rectifier GL1 and ensures sinusoidal current drawing from the electricity mains. An intermediate circuit capacitor C10 is connected in parallel with the output of the step-up converter HS1, the supply voltage for the half-bridge invertor HW1 connected downstream being provided across said capacitor. The switching transistors of the half-bridge inverter HW1 and also of the step-up converter HS1 are driven with the aid of the integrated circuit IC1, which receives its supply voltage via the voltage supply terminal j14 and a further, earthed terminal j15. A load circuit designed as a resonant circuit is connected to the half-bridge invertor HW1 and has the resonance inductor L10, the capacitors C11, C12 and the electrical terminals j12, j13. The electrical terminals j12, j13 are connected in parallel with the capacitors C11, C12 and serve for the connection of the electrodeless discharge lamp LP1, that is to say for the connection of at least one induction coil L11 of the electrodeless discharge lamp LP1. A respective terminal of the capacitors C10, C11, C12 is connected to the earthed junction point V11. The capacitor C12 decouples the terminal j13 from the earth terminal V11 in terms of direct current.

The first exemplary embodiment represented in FIG. 1 additionally has a non-reactive resistor R10, which is connected to the positive pole of the intermediate circuit capacitor C10, on the one hand, and to the tap V10 in the load circuit, on the other hand. The supply current for the integrated circuit IC1 flows, proceeding from the positive pole of the intermediate circuit capacitor C10, via the resistor R10, the resonance inductor L10, the electrical terminal j12, the at least one induction coil L11 of the electrodeless discharge lamp LP1 and the electrical terminal j13 to the positive voltage supply terminal j14 of the integrated circuit IC1.

In the absence of a lamp LP1, that is to say with no induction coil L11 connected, the DC path is interrupted between the terminals j12, j13. In that case, the integrated circuit IC1 receives no supply voltage, despite the mains voltage present at the voltage input j10, j11. As a result, neither the half-bridge invertor HW1 nor the step-up converter HS1 can start operating; The half-bridge invertor HW1 and the step-up converter HS1 start to oscillate only after the DC path has been closed beforehand by the connection of the at least one induction coil L11 of the lamp LP1 to the terminals j12, j13. If the electrodeless discharge lamp LP1 has a plurality of induction coils L11, for example two, then these induction coils are likewise connected to the terminals j12, j13, in such a way that they are connected in parallel with the induction coil L11.

FIG. 2 represents the second exemplary embodiment of the circuit arrangement according to the invention in a schematic illustration. The circuit arrangement according to the second exemplary embodiment has a mains voltage input with the mains voltage terminals j20, j21, a filter and a mains voltage rectifier GL2, a step-up converter HS2 connected downstream, an intermediate circuit capacitor C20, which is connected to the output of the step-up converter HS2 and supplies the supply voltage for a half-bridge invertor HW2. Connected downstream of the half-bridge inverter HW2 is a load circuit which is designed as a resonant circuit and has the resonance inductor L20, the capacitors C21, C22 and two electrical terminals j22, j23 for an electrodeless discharge lamp LP2. The half-bridge invertor HW2 is driven with the aid of an integrated circuit IC2, which also generates the driving pulses for the step-up converter HS2. The integrated circuit IC2 has its supply voltage fed to it via the earthed terminal j25 and the further terminal j24. The circuit arrangement additionally has a non-reactive resistor R20, which is connected to the positive pole of the intermediate circuit capacitor C20, on the one hand, and to a tap between the resonance inductor L20 and the electrical terminal j22 in the load circuit, on the other hand. The supply current for the integrated circuit IC2 flows, proceeding from the positive pole of the intermediate circuit capacitor C20, via the resistor R20, the electrical terminal j22, the at least one induction coil L21 of the electrodeless discharge lamp LP2 and the electrical terminal j23 to the positive voltage supply terminal j24 of the integrated circuit IC2. The capacitor C22 decouples the terminal j23 from the earth terminal V21 in terms of direct current.

In the absence of a lamp LP2, that is to say with no induction coil L21 connected, the DC path is interrupted between the terminals j22, j23. In that case, the integrated circuit IC2 receives no supply voltage, despite the mains voltage present at the voltage input j20, j21. As a result, neither the half-bridge invertor HW2 nor the step-up convertor HS2 can start operating. The circuit arrangement of this second exemplary embodiment differs from that of the first exemplary embodiment only by the fact that the resonance inductor L20 of the second exemplary embodiment is not connected into the DC path, in contrast to the inductor of the first exemplary embodiment.

The third exemplary embodiment of the invention represented in FIG. 3 has a mains voltage input with the mains voltage terminals j30, j31, a filter and a mains voltage rectifier GL3, a step-up convertor HS3 connected downstream, an intermediate circuit capacitor C30, which is connected to the output of the step-up convertor HS3 and supplies the supply voltage for an invertor HW3. Connected downstream of the invertor HW3 is a load circuit which is designed as a resonant circuit and has the resonance inductor L30, the capacitors C31, C32 and two electrical terminals j32, j33 for the at least one induction coil L31 of an electrodeless discharge lamp LP3. The invertor HW3 is driven with the aid of a control circuit S3. The ignition capacitor C31 is connected in parallel with the terminals j32, j33. One terminal of the balancing capacitor C32 is connected to the invertor HW3, while the other terminal of the balancing capacitor C32 is connected via the tap V30 to the resonance inductor L30. This circuit arrangement additionally has a non-reactive resistor R30, which is connected to the positive pole of the intermediate circuit capacitor C30, on the one hand, and to the tap V30 in the load circuit, on the other hand. The tap V30 is furthermore connected to an input of the control circuit S3. The control circuit S3 has a monitoring element which is connected upstream or integrated into the control circuit, said monitoring element being, for example, a logic circuit which monitors the electrical potential at the tap V30 and forwards a corresponding evaluation signal to the control unit S3. If no lamp LP3 is connected to the terminals j32, j33, then the tap V30 is at a comparatively high electrical potential essentially determined by the charge state of the intermediate circuit capacitor C30. If, on the other hand, at least one lamp LP3 is connected to the terminals j32, j33, then the tap V30 is connected to earth via the resonance inductor L30 and the induction coil L31 and the tap V30 is therefore at a comparatively low electrical potential. The monitoring element generates a digital or analogue evaluation signal corresponding to the electrical potential at the tap V30 and feeds said signal to the control circuit S3. The control circuit S3 is designed in such a way that it enables the invertor HW3 to start oscillating only when the electrical potential at the tap V30 falls below a predetermined value prescribed by the dimensioning of the circuit components. This ensures that no ignition attempts are made in the absence of a lamp LP3.

The fourth exemplary embodiment of the invention represented in FIG. 4 has a mains voltage input with the mains voltage terminals j40, j41, a filter and a mains voltage rectifier GL4, a step-up converter HS4 connected downstream, an intermediate circuit capacitor C40, which is connected to the output of the step-up converter HS4 and supplies the supply voltage for an invertor HW4. Connected downstream of the invertor HW4 is a load circuit which is designed as a resonant circuit and has the resonance inductor L40, the capacitors C41, C42 and two electrical terminals j42, j43 for the at least one induction coil L41 of an electrodeless discharge lamp LP4. The invertor HW4 is driven with the aid of a control circuit S4. The ignition capacitor C41 is connected in parallel with the terminals j42, j43. One terminal of the balancing capacitor C42 is connected to the invertor HW4, while the other terminal of the balancing capacitor C42 is connected via the tap V40 to the resonance inductor L40. The tap V40 is furthermore connected to an input of the control circuit S4. This circuit arrangement additionally has a non-reactive resistor R40, which is connected to the positive pole of the intermediate circuit capacitor C40, on the one hand, and to a tap between the resonance inductor L40 and the terminal j42 in the load circuit, on the other hand. The control circuit S4 monitors the electrical potential at the tap V40. If no lamp LP4 is connected to the terminals j42, j43, then the tap V40 is at a comparatively high electrical potential essentially determined by the charge state of the intermediate circuit capacitor C40. If, on the other hand, at least one lamp LP4 is connected to the terminals j42, j43, then the tap V40 is connected to earth via the induction coil L41 and the tap V40 is therefore at a comparatively low electrical potential. The control circuit S4 has a monitoring element which is connected upstream or integrated into the control circuit, said monitoring element being, for example, a logic circuit which monitors the electrical potential at the tap V40 and generates a corresponding digital or analogue evaluation signal and feeds it to the control unit S4. The control circuit S4 is designed in such a way that it enables the invertor HW4 to start oscillating only when the electrical potential at the tap V40 falls below a predetermined value prescribed by the dimensioning of the circuit components. This ensures that no ignition attempts are made in the absence of a lamp LP4.

The invention is not restricted to the exemplary embodiments explained in more detail above. By way of example, it is possible for the invention not just to be applied to externally controlled half-bridge invertors, rather it can also be applied to other voltage invertors such as, for example, full-bridge invertors or free-running half-bridge invertors.

The circuit arrangement of the fifth exemplary embodiment as represented in FIG. 5 shows the application of the invention to a full-bridge invertor. The circuit arrangement according to the fifth exemplary embodiment has, in a manner similar to that described for the first exemplary embodiment, a mains voltage connection, a filter and a mains voltage rectifier and also a step-up converter, which are not represented in FIG. 5. The terminals j50, j51 shown in FIG. 5 are connected to the output of the step-up converter, with the result that the intermediate circuit capacitor C50 is connected in parallel with the output of the step-up converter. A full-bridge invertor comprising the switching transistors Q1, Q2, Q3, Q4 and a control circuit (not represented) is connected downstream of the intermediate circuit capacitor C50. A resonance inductor L50, an ignition capacitor C51 and a balancing capacitor C52 are arranged in the bridge path of the full-bridge invertor Q1, Q2, Q3, Q4. Two electrical terminals j52, j53 are connected in parallel with the ignition capacitor C51 and serve for the connection of at least one induction coil L51 of an electrodeless discharge lamp LP5. Furthermore, the circuit arrangement has a non-reactive resistor R50, which is connected to the positive pole of the intermediate circuit capacitor C50, on the one hand, and to a tap in the bridge path, on the other hand, and a current lead j54, which connects the control circuit (not represented) of the full-bridge invertor Q1, Q2, Q3, Q4 to a further tap in the bridge path. A DC path is produced in this way, into which are connected, proceeding from the positive pole of the intermediate circuit capacitor C50, the non-reactive resistor R50, the resonance inductor L50, the terminal j52, the induction coil L51 of the discharge lamp LP5, the terminal j53 and the current lead j54. This DC path is interrupted in the absence of a discharge lamp LP5. In that case, the control circuit, which, by way of example, may be designed as an integrated circuit in a manner similar to that in the first exemplary embodiment, receives no supply voltage and the full-bridge invertor Q1, Q2, Q3, Q4 cannot start to oscillate. The circuit arrangement does not, therefore, make any ignition attempts in the absence of a discharge lamp LP5.

FIG. 6 shows the application of the invention to a free-running half-bridge invertor according to a sixth exemplary embodiment. This circuit arrangement has, in a manner similar to that described for the first exemplary embodiment, a mains voltage terminal, a filter and a mains voltage rectifier and also a step-up converter, which are not represented in FIG. 6. The terminals j60, j61 shown in Figure [lacuna] are connected to the output of the step-up converter, with the result that the intermediate circuit capacitor C60 is connected in parallel with the output of the step-up converter. A half-bridge invertor formed by the two switching transistors Q5, Q6 is connected downstream of the intermediate circuit capacitor C60. A load circuit which is designed as a resonant circuit and has a resonance inductor L60, an ignition capacitor C61, a balancing capacitor C62 and two electrical terminals j62, j63—arranged in parallel with the ignition capacitor C61—for at least one induction coil L61 of an electrodeless discharge lamp LP6 is connected to the centre tap between the two switching transistors Q5, Q6. This circuit arrangement additionally has a non-reactive resistor R60, which is connected to the positive pole of the intermediate circuit capacitor C60, on the one hand, and to a tap in the load circuit, on the other hand, for example to the centre tap between the two switching transistors Q5, Q6, and a current lead j64, which connects a second tap in the load circuit, said tap being located between the terminal j63 and the balancing capacitor, to an input of the control circuit (not represented) of the half-bridge invertor Q5, Q6. The control circuit of the half-bridge invertor Q5, Q6 comprises a transformer (not represented) having a primary winding connected into the load circuit of the half-bridge invertor and two secondary windings each connected to the control electrode of one of the two switching transistors Q5, Q6, and also a starting circuit which, with the aid of a diac, generates trigger pulses for the control electrode of the switching transistor Q6 in order to enable the half-bridge invertor to start oscillating. Such a free-running half-bridge invertor with such a control circuit is described for example in the German Patent Application with the official file reference 196 50 110.5.

The current lead j64 is connected to the input of the starting circuit. In the absence of a discharge lamp LP6, the balancing capacitor C62 is charged only to an insufficient extent owing to its very large capacitance in comparison with the ignition capacitor C61, and the voltage drop across the balancing capacitor C62 is therefore comparatively small. Therefore, the starting circuit is supplied with voltage only to an insufficient extent via the current lead j64 in the absence of a discharge lamp LP6, with the result that the half-bridge invertor cannot start oscillating.

FIGS. 7 to 13 show exemplary embodiments for circuit arrangements for operating two electrodeless discharge lamps in each case.

Figure 7:
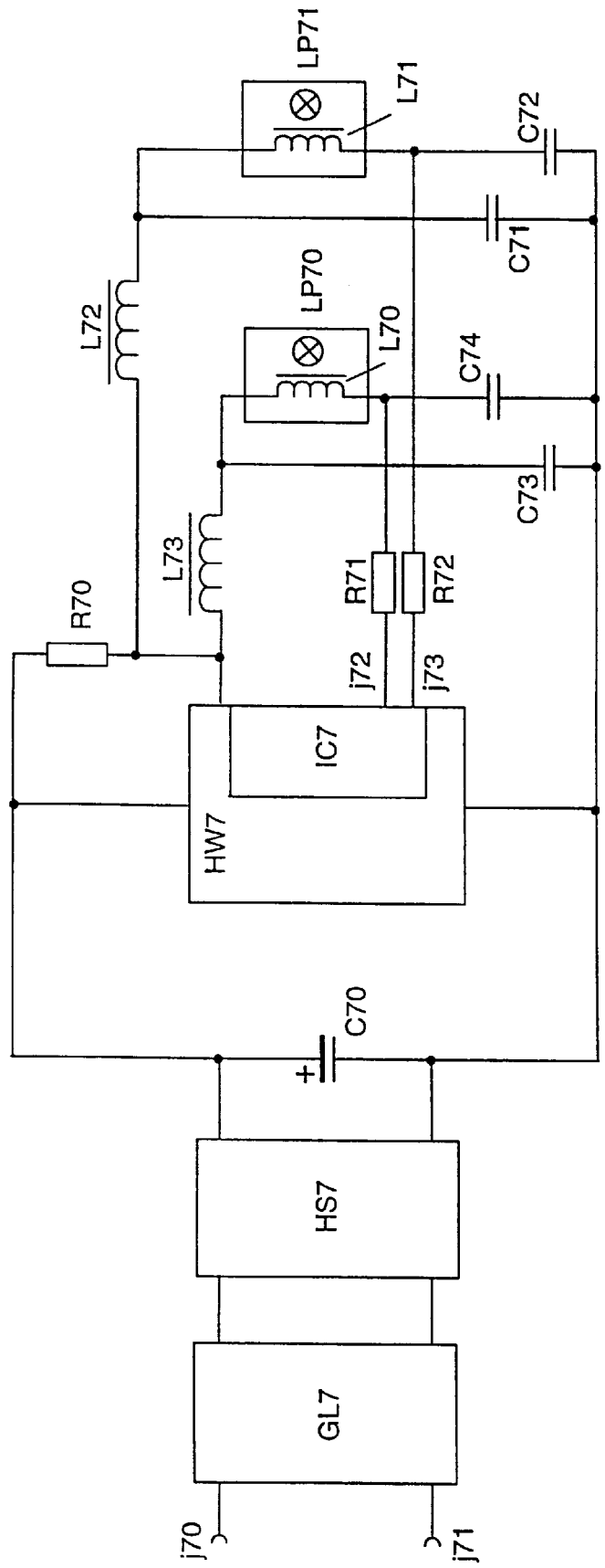

The circuit arrangement according to the seventh exemplary embodiment as represented in FIG. 7 has a mains voltage input j70, j71, a filter circuit with a mains voltage rectifier GL7 connected downstream, said filter circuit being connected to the mains voltage input, a step-up converter HS7 connected to the DC voltage output of the rectifier GL7, an intermediate circuit capacitor C70 arranged in parallel with the output of the step-up converter HS7, and an externally controlled half-bridge invertor HW7, whose input is connected in parallel with the intermediate circuit capacitor C70. The half-bridge invertor HW7 is driven by means of an integrated circuit IC7, which receives its supply voltage via its terminals j72 and j73 and the resistors R70, R71 and R72. Two load circuits which are connected in parallel and are designed as resonant circuits are connected to the half-bridge invertor HW7, said load circuits each having a resonance inductor L72 and L73, respectively, a resonance capacitor C71 and C73, respectively, and also a further capacitor C72 and C74, respectively, and an electrodeless discharge lamp LP70 and LP71, respectively. The supply current for the integrated circuit IC7 flows via the two resonance inductors L72, L73 and via the induction coils L71 and L72 of the two electrodeless discharge lamps LP70, LP71. If one of the discharge lamps LP70 or LP71 is absent, then the integrated circuit IC7 is not supplied with voltage and the half-bridge invertor HW7 cannot start oscillating.

Figure 8:
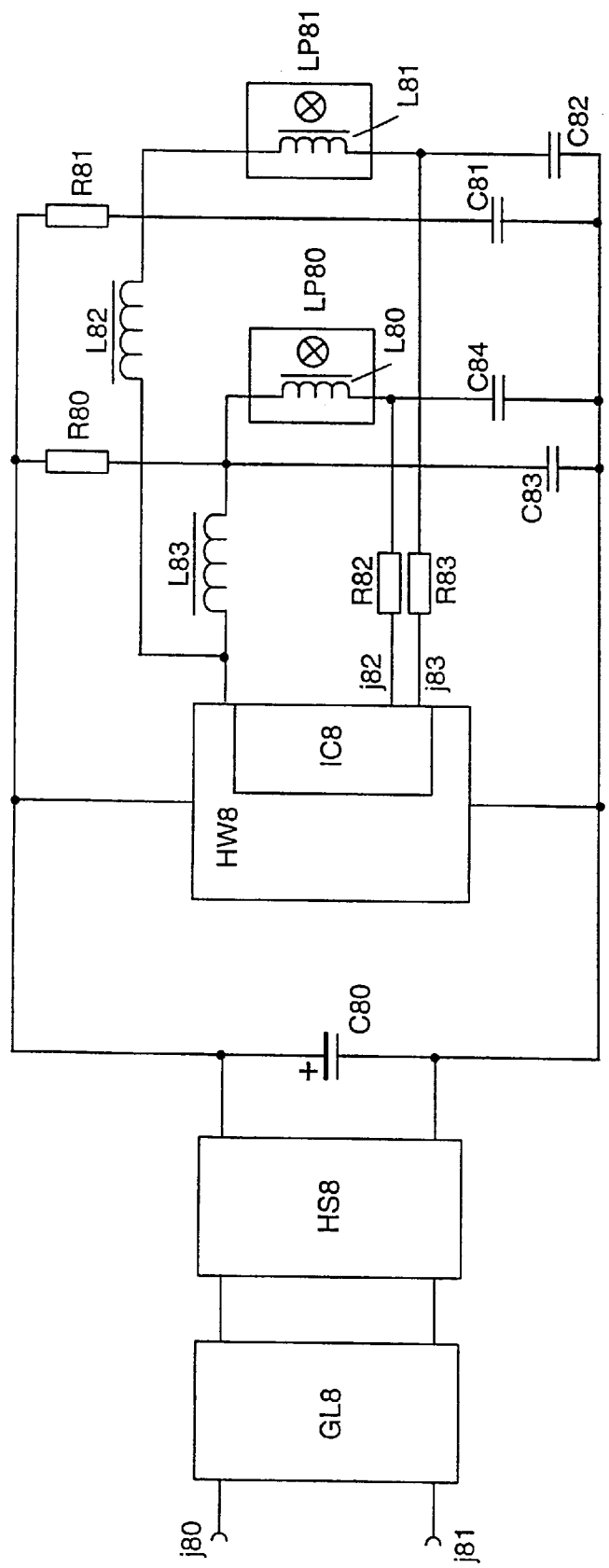

The eighth exemplary embodiment represented in FIG. 8 has a mains voltage input j80, j81, a filter circuit with a mains voltage rectifier GL8 connected downstream, said filter circuit being connected to the mains voltage input, a step-up convertor HS8 connected to the DC voltage output of the rectifier GL8, an intermediate circuit capacitor C80 arranged in parallel with the output of the step-up converter HS8, and an externally controlled half-bridge invertor HW8, whose input is connected in parallel with the intermediate circuit capacitor C80. The half-bridge invertor HW8 is driven by means of an integrated circuit IC8, which receives its supply voltage via its terminals j82 and j83 and the resistors R80, R81, R82 and R83. Two load circuits which are connected in parallel and designed as resonant circuits are connected to the half-bridge invertor HW8, said load circuits each having a resonance inductor L82 and L83, respectively, a resonance capacitor C81 and C82, respectively, and also a further capacitor C82 and C84, respectively, and an electrodeless discharge lamp LP80 and LP81, respectively. In this case, the supply current for the integrated circuit IC8 does not flow via the two resonance inductors L82, L83, as in the case of the seventh exemplary embodiment, but rather only via the induction coils L81 and L82 of the two electrodeless discharge lamps LP80, LP81. If one of the discharge lamps LP80 or LP81 is absent, then the integrated circuit IC8 is not supplied with voltage and the half-bridge invertor HW8 cannot start oscillating.

The ninth exemplary embodiment of the invention as represented in FIG. 9 has a mains voltage input with the mains voltage terminals j90, j91, a filter and a mains voltage rectifier GL9, a step-up convertor HS9 connected downstream, an intermediate circuit capacitor C90, which is connected to the output of the step-up convertor HS9 and supplies the supply voltage for an invertor HW9. Two load circuits which are connected in parallel and are designed as resonant circuits are connected to the invertor HW9, said load circuits each having a resonance inductor L90 and L91, respectively, capacitors C91, C92 and C93, C94, respectively, and two electrical terminals j92, j93 and j94, j95, respectively, for the at least one induction coil L92 and L93, respectively, of an electrodeless discharge lamp LP90 and LP91, respectively. The invertor HW9 is driven with the aid of a control circuit S9. The respective ignition capacitors C93 and C94 are connected in parallel with the respective terminals j92, j93 and j94, j95. One terminal of the balancing capacitors C91 and C92 is respectively connected to the invertor HW9, while their other terminal is connected to the resonance inductor L90 and L91, respectively, via the tap V90 and V91, respectively. This circuit arrangement additionally has two non-reactive resistors R90, R91, which are each connected to the positive pole of the intermediate circuit capacitor C90, on the one hand, and to the tap V90 and V91, respectively, in the respective load circuit, on the other hand. The taps V90, V91 are furthermore respectively connected to an input of the control circuit S9. The control circuit S9 has a monitoring element which is connected upstream or integrated into the control circuit, said monitoring element being, for example, a logic circuit which monitors the electrical potential at the taps V90 and V91 and forwards a corresponding evaluation signal to the control unit S9. If no lamp LP90, LP91 is connected to the terminals j92, j93 or j94, j95, then the tap V90 or V91, respectively, is at a comparatively high electrical potential essentially determined by the charge state of the intermediate circuit capacitor C90. If, on the other hand, a lamp LP90 or LP91, respectively, is connected to the terminals j92, j93 or j94, j95, respectively, then the tap V90 or V91, respectively, is connected to earth via the respective resonance inductor L90 or L91 and the corresponding induction coil L92 or L93, respectively and the tap V90 or V91, respectively, is therefore at a comparatively low electrical potential. The monitoring element generates a digital or analogue evaluation signal corresponding to the electrical potential at the tap V90 or V91, respectively, and feeds said signal to the control circuit S9. The control circuit S9 is designed in such a way that it enables the invertor HW9 to start oscillating only when the electrical potential at the taps V90 and V91 falls below a predetermined value prescribed by the dimensioning of the circuit components. This ensures that no ignition attempts are made in the absence of a lamp LP90 or LP91.

The tenth exemplary embodiment represented in FIG. 10 largely corresponds to the ninth exemplary embodiment. The method of operation of the circuit arrangements of these two exemplary embodiments is identical. The resistors R90, R91 have simply been replaced by the equivalent resistors R90' and R91', which are connected to the positive terminal of the intermediate circuit capacitor C90, on the one hand, and to a tap arranged between the resonance inductor and the lamp in the respective load circuit, on the other hand. All the other components correspond to one another. Therefore, the same reference symbols have been used for identical components in FIGS. 9 and 10.

The circuit arrangement of the eleventh exemplary embodiment as represented in FIG. 11 shows the application of the invention to a full-bridge invertor for operating two electrodeless discharge lamps LP110, LP111 connected in parallel. The circuit arrangement according to this exemplary embodiment has, in a manner similar to that described for the first exemplary embodiment, a mains voltage connection, a filter and a mains voltage rectifier and also a step-up convertor, which are not represented in FIG. 11. The terminals j110, j111 shown in FIG. 11 are connected to the output of the step-up convertor, with the result that the intermediate circuit capacitor C109 is connected in parallel with the output of the step-up convertor. A full-bridge invertor comprising the switching transistors Q110, Q111, Q112, Q113 and a control circuit (not represented) is connected downstream of the intermediate circuit capacitor C109. Two resonant circuits which are connected in parallel and each have a resonance inductor L110 and L111, respectively, an ignition capacitor C110 and C111, respectively, and a balancing capacitor C112 and C113, respectively, are arranged in the bridge path of the full-bridge invertor Q110, Q111, Q112, Q113. Two electrical terminals j112, j113 and j114, 115 are respectively connected in parallel with the respective ignition capacitor C110 and C111 and serve for the connection of at least one induction coil L112 and L113, respectively, of an electrodeless discharge lamp LP110 and LP111, respectively. Furthermore, the circuit arrangement has a non-reactive resistor R110, which is arranged in parallel with the switching path of the transistor Q 110, and two current leads j116, 117, which connect the control circuit (not represented) of the full-bridge invertor Q110, Q111, Q112, Q113 to a respective tap in one of the bridge paths in each case. Two DC paths are produced in this way, into which are connected, in each case proceeding from the positive pole of the intermediate circuit capacitor C109, the non-reactive resistor R110, the first resonance inductor L110, the terminal j112, the induction coil L112 of the first discharge lamp LP110, the terminal j113 and the first current lead j116, and, respectively, the non-reactive resistor R110, the second resonance inductor L111, the terminal j114, the induction coil L113 of the second discharge lamp LP111, the terminal j115 and the second current lead j117. If one of the discharge lamps LP110 or 111 is absent, then one of these DC paths is interrupted. In that case, the control circuit, which, by way of example, may be designed as an integrated circuit in a manner similar to that in the case of the seventh exemplary embodiment, receives no supply voltage and the full-bridge invertor cannot start oscillating. The circuit arrangement does not make any ignition attempts in that case.

FIG. 12 shows, according to the twelfth exemplary embodiment, the application of the invention to a free-running half-bridge invertor for operating two electrodeless discharge lamps connected in parallel. This circuit arrangement has, in a manner similar to that described for the first exemplary embodiment, a mains voltage connection, a filter and a mains voltage rectifier and also a step-up converter, which are not represented in FIG. 12. The terminals j120, j121 shown in FIG. 12 are connected to the output of the step-up converter, with the result that the intermediate circuit capacitor C120 is connected in parallel with the output of the step-up converter. A half-bridge invertor formed by the two switching transistors Q120, Q121 is connected downstream of the intermediate circuit capacitor C120. Two load circuits which are designed as resonant circuits and are arranged in parallel with one another are connected to the centre tap between the two switching transistors Q120, Q121, said load circuits each having a resonance inductor L120 and L121, respectively, an ignition capacitor C121 and C123, respectively, a balancing capacitor C122 and C124, respectively, and two electrical terminals j122, j123 and j124, j125, respectively, for at least one induction coil L122 and L123, respectively, of an electrodeless discharge lamp LP122 and LP121, respectively, said electrical terminals being arranged in parallel with the respective ignition capacitor C121 and C123. This circuit arrangement additionally has a non-reactive resistor R120, which is connected to the positive pole of the intermediate circuit capacitor C120, on the one hand, and to the centre tap between the two switching transistors Q120, Q121, on the other hand, and two current leads j126, j127, which in each case connect a tap in the respective load circuit to an input of the control circuit (not represented) of the half-bridge invertor Q120, Q121, said tap being located between the terminal j123 and j125, respectively, and the corresponding balancing capacitor C122 and C124, respectively. The control circuit of the half-bridge invertor Q120, Q121 comprises a transformer (not represented) having a primary winding connected into the load circuit of the half-bridge invertor and two secondary windings which are respectively connected to the control electrode of one of the two switching transistors Q120, Q121, and also a starting circuit which, with the aid of a diac, generates trigger pulses for the control electrode of the switching transistor Q121 in order to enable the half-bridge invertor to start oscillating. Such a free-running half-bridge invertor with such a control circuit is described for example in the German Patent Application with the official file reference 196 50 110.5.

The current leads j126, j127 are connected to the input of the starting circuit, for example via an AND circuit. If one of the discharge lamps LP122 or LP121 is absent, then the corresponding balancing capacitor C122 or C124, respectively, is charged only to an insufficient extent owing to its very large capacitance in comparison with the ignition capacitor C121 or C123, respectively, and the voltage drop across the respective balancing capacitor C122 or C124 is therefore comparatively small. Therefore, the starting circuit is supplied with voltage only to an insufficient extent via the current leads j126 and j127 in the absence of a discharge lamp LP121 or LP122, respectively, with the result that the half-bridge invertor cannot start oscillating.

FIG. 13 represents a circuit arrangement according to the thirteenth exemplary embodiment of the invention, which serves for operating two electrodeless discharge lamps connected in series. The circuit arrangement represented in FIG. 13 has a mains voltage input j130, j131, a filter circuit with a mains voltage rectifier GL13 connected downstream, said filter circuit being connected to the mains voltage input, a step-up converter HS13 connected to the DC voltage output of the rectifier CL13, an intermediate circuit capacitor C130 arranged in parallel with the output of the step-up converter HS13, and an externally controlled half-bridge invertor HW13, whose input is connected in parallel with the intermediate circuit capacitor C70. The half-bridge invertor HW13 is driven by means of an integrated circuit IC13, which receives its supply voltage via its terminals j132 and j133. The terminal j133 is at earth potential, while the other terminal is connected, in terms of direct current, to the positive terminal of the intermediate circuit capacitor C130 via the series-connected induction coils L131, L132 of the electrodeless discharge lamps LP130 and LP131, the resonance inductor L130 and the non-reactive resistor R130. If one of the two lamps LP130 or L-P131 is absent, then the abovementioned DC path connecting the terminal j132 to the positive terminal of the intermediate circuit capacitor C130 is interrupted. In this case, the integrated circuit IC13 receives no supply voltage and the half-bridge invertor HW13 cannot start oscillating.

What is claimed is:

1. A circuit for operating an electrodeless discharge lamp, the circuit comprising:

a voltage converter;

a control circuit that drives said voltage converter;

a load circuit connected downstream of said voltage converter, said load circuit having a tap therein;

connection terminals for an electrodeless discharge lamp; and an electrical potential monitor connected to said tap that generates a signal for said control circuit that corresponds to an electrical potential at said tap, said tap having a first electrical potential when an electrodeless discharge lamp is connected to said terminals and a second electrical potential when an electrodeless discharge lamp is not connected to said terminals, said control circuit driving said voltage converter when the signal corresponds to the first potential and not driving said voltage converter when the signal corresponds to the second potential.

2. The circuit of claim 1, wherein said voltage converter is an inverter and said load circuit is a resonance circuit.

3. The circuit of claim 1, wherein said monitor is a logic circuit.

4. A circuit for operating an electrodeless discharge lamp, the circuit comprising:

an intermediate circuit capacitor across an input voltage;

a nonreactive resistor connected to one pole of said intermediate circuit capacitor;

a voltage converter connected downstream of said intermediate circuit capacitor and having a supply voltage provided across said intermediate circuit capacitor;

a control circuit that drives said voltage converter;

a load circuit connected downstream of said voltage converter; and connection terminals for an electrodeless discharge lamp, said control circuit receiving a supply current that flows from the one pole of said intermediate circuit capacitor, through said nonreactive resistor and through an induction coil of an electrodeless discharge lamp when an electrodeless discharge lamp is connected to said terminals, said control circuit not receiving the supply current when an electrodeless discharge lamp is not connected to said terminals.

5. The circuit of claim 4, wherein the supply current flows through said load circuit after going through said nonreactive resistor.

* * * * *